(12) United States Patent
Lau et al.

(10) Patent No.: US 7,455,263 B2
(45) Date of Patent: Nov. 25, 2008

(54) AIRPLANE INTERIOR SYSTEMS

(75) Inventors: Charles K. Lau, Everett (CA); Juliane B. Trummer, Seattle, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 10/907,990

(22) Filed: Apr. 22, 2005

(65) Prior Publication Data
US 2006/0237585 A1    Oct. 26, 2006

(51) Int. Cl.
B64D 11/00    (2006.01)
(52) U.S. Cl. .................................. 244/118.5
(58) Field of Classification Search ............. 244/118.5
See application file for complete search history.

(56) References Cited

U.S. PATENT DOCUMENTS

| | | | |
|---|---|---|---|
| 2,111,326 A | | 3/1938 | Norris |
| 2,160,066 A | | 5/1939 | Frische |
| 2,415,240 A | | 2/1947 | Fouhy |
| 2,877,970 A | | 3/1959 | Albertine |
| 3,154,888 A | | 11/1964 | Graham |
| 3,330,506 A | | 7/1967 | Robillard et al. |
| 3,405,893 A | | 10/1968 | Flamand et al. |
| 4,055,317 A | | 10/1977 | Greiss |
| 4,066,227 A | * | 1/1978 | Buchsel ............... 244/118.6 |
| 4,487,034 A | | 12/1984 | Cronin et al. |
| 4,645,145 A | | 2/1987 | Alie |
| 4,876,828 A | | 10/1989 | Brill |
| 4,911,219 A | | 3/1990 | Dalrymple |
| 5,129,597 A | | 7/1992 | Manthey et al. |
| 5,245,802 A | | 9/1993 | Davis |
| 5,441,218 A | * | 8/1995 | Mueller et al. ........... 244/118.1 |
| 5,816,534 A | * | 10/1998 | Schumacher ............. 244/119 |
| 5,938,149 A | * | 8/1999 | Terwesten ............. 244/118.5 |
| 6,003,813 A | * | 12/1999 | Wentland et al. ......... 244/118.5 |
| 6,007,025 A | | 12/1999 | Coughren et al. |

(Continued)

FOREIGN PATENT DOCUMENTS

EP    0325756    8/1989

(Continued)

OTHER PUBLICATIONS

"Architectural glass." Wikipedia, The Free Encyclopedia. May 10, 2006, 07:49 UTC. Wikimedia Foundation, Inc. May 29, 2006 <http://en.wikipedia.org/w/index.php?title=Architectural_glass&oldid=52454909>.*

(Continued)

*Primary Examiner*—Tien Dinh
(74) *Attorney, Agent, or Firm*—Ostrager Chong Flaherty & Broitman P.C.

(57) ABSTRACT

Interior architectural structures and lighting for aircraft, particularly commercial passenger airplanes. Light diffusers and ceiling panels in a "wing-shape" and other secondary panels are utilized to create different interior designs and structures. A permeable secondary panel is utilized in one passenger cabin in order to provide a more private-type space. An enlarged ceiling arch with blended curves forming a "wing-type" configuration provides a more spacious cabin arrangement. Other features include air and light diffusers, passenger service modules, a "shelf"-like configuration and lighting above the airplane entrance/exit door, and bulkheads and monuments positioned at various positions in the cabin.

11 Claims, 11 Drawing Sheets

U.S. PATENT DOCUMENTS

| | | | |
|---|---|---|---|
| 6,082,075 A | 7/2000 | Rysgaard | |
| 6,158,690 A | 12/2000 | Wadey et al. | |
| 6,413,159 B1 | 7/2002 | Bates, III et al. | |
| 6,491,254 B1 | 12/2002 | Walkinshaw et al. | |
| 6,874,731 B1* | 4/2005 | Brauer et al. | 244/118.5 |
| 6,986,485 B2* | 1/2006 | Farnsworth | 244/118.5 |
| 2003/0141414 A1* | 7/2003 | Itakura et al. | 244/118.5 |
| 2003/0189132 A1* | 10/2003 | Brady et al. | 244/118.5 |
| 2004/0016847 A1* | 1/2004 | Ritts | 244/118.5 |
| 2005/0072878 A1* | 4/2005 | Ritts | 244/118.5 |
| 2005/0167546 A1* | 8/2005 | Jones et al. | 244/118.5 |
| 2005/0178906 A1* | 8/2005 | Brauer et al. | 244/118.5 |
| 2005/0230542 A1* | 10/2005 | Farnsworth | 244/118.5 |
| 2006/0157620 A1* | 7/2006 | Granzeier et al. | 244/129.1 |

FOREIGN PATENT DOCUMENTS

| | | |
|---|---|---|
| EP | 0 774 815 A2 | 5/1997 |
| EP | 0867365 | 9/1998 |
| EP | 1106502 | 6/2001 |
| EP | 1167184 | 1/2002 |
| EP | 1452397 | 9/2004 |
| FR | 876942 | 11/1942 |
| FR | 933414 | 4/1948 |
| FR | 2303711 | 8/1976 |
| WO | WO 92/18730 | 10/1992 |
| WO | WO 02/066324 | 8/2002 |

OTHER PUBLICATIONS

"Laminate." Wikipedia, The Free Encyclopedia. May 16, 2006, 02:50 UTC. Wikimedia Foundation, Inc. May 29, 2006 <http://en.wikipedia.org/w/index.php?title=Laminate&oldid=53440173>.*

* cited by examiner

AIRPLANE INTERIOR SYSTEMS

TECHNICAL FIELD

The present invention relates to interior systems for aircraft, particularly interior systems for commercial passenger airplanes.

BACKGROUND

The interior configuration and architecture of airplanes has become relatively standardized today. The arrangement of the passenger seats, bulkheads, lavatories, serving areas, and the like have been developed for convenience and accommodation of both passengers and crew. The passenger compartments are typically divided into two or more sections with bulkheads and lavatories being positioned accordingly. Aisles and passageway spaces are left between sets of seats and at the access doors.

The passenger compartments of aircraft typically have sidewall members with a plurality of windows, a floor panel or member and a ceiling member or assembly of some type. In addition, pluralities of rows of storage bins are positioned on the aircraft generally at the position between the sidewall members and the ceiling members. In general, the space in the passenger cabins and airplanes is limited and can even be called claustrophobic at times. In this regard, the design and architecture of the interiors of passenger aircraft, particularly the passenger cabins, have remained typically constant for a long period of time and have not had a significant variety of changes or updates as common in many industries.

There is a need in the aircraft industry for new and innovative solutions to passenger space, cabins and furnishings. There also is a need to change or vary the aesthetics of passenger cabins in order to improve the perception and aesthetics of the space, as well as possibly catering to the different moods of the passengers and changing of the situations dramatizing the key rituals performed aboard an aircraft, such as boarding, resting, eating, and the like.

SUMMARY OF THE INVENTION

The present invention provides new and innovative solutions to the present situation on passenger aircraft, particularly the traditional and often outdated "look and feel". In particular, the invention maximizes the interest, elegance, and ergonomic quality of the passenger space which is available. By changing the interior architectural lines, as well as the lighting and lighting fixtures, the perception of the space inside the passenger cabin is changed and can be altered when desired. For example, the interior architecture and lighting can be changed to cater to different passenger moods and also dramatize the key rituals performed aboard aircraft, such as boarding, resting, eating and the like. Also, different aesthetic and special passenger interests can be provided by changing the architectural structures and lines.

The system for lighting passenger cabins has been changed in order to modulate the space into different scenarios. These scenarios include the perception of making the space appear to be larger and also to one which is more private and nurturing, as defined by a lower ceiling.

Secondary panels extending below the ceiling member can act as air diffusers, noise attenuators and light diffusers in order to change the atmosphere and perception of the passenger cabin space and architecture. In order to form a higher ceiling, a curved arch-type ceiling structure is provided, preferably with a constant radius. The ceiling structure begins with subtle concavity of the outboard luggage bins which leads the passenger's eyes up to the crown where a lens is positioned. The lens continues the line of the luggage bins until the unit merges into and is flush with the upper ceiling in an approximately half circle. The lens also diffuses the light and filters it down over the upper ceiling and storage bins onto the secondary panels and further into the cabin.

For a lower ceiling, a secondary ceiling panel is positioned below the regular ceiling panel and has a look and configuration reminiscent of an airplane wing. The secondary ceiling panel reflects light as well as lets light through softly from a backlit lighting member. By increasing the amount of light that deflects from the secondary ceiling panel and decreasing the amount of light that diffuses from the lens from the crown, the perception can be shifted to simulate a smaller, more nurturing volume. The secondary panel member also permits an exchange between two adjacent passenger cabin spaces. Although the two spaces are different and yet adjacent one another, the two spaces interrelate with one another and can be sensed relative to each other.

In one passenger cabin, the ceiling has a shape reminiscent of the wing of a bird with a concave central section and two outer convex sections. The central section typically has one or two rows of inboard stowage bins, while the other sections comprise curved translucent and preferably permeable panel members. Lighting systems and diffusers filter the light through the outer panels and along the outboard stowage bins and sidewall members.

As used herein "wing shaped" shall mean an identified part of the interior structure for a passenger compartment of an airplane, resembling a bird's wing in appearance when extended for flight with a concave central section and two outer convex sections extending centrally on both sides.

Further details, benefits and features of the present invention will become available from the following description when taken in connection with the accompanying drawings.

DESCRIPTION OF THE PREFERRED EMBODIMENTS

The passenger cabins of commercial airliners today have become relatively standardized and have not had a significant amount of innovation. The space itself in passenger cabins is quite limited due to the external size and configuration of the airplane itself and thus any changes are necessarily limited to begin with. However, with the present invention, the interest, elegance, and ergonomic quality of the space is enhanced and increased significantly. The interior architectural structures, architectural sight lines and lighting systems have been changed to change the passenger's perception of the passenger cabin, particularly when entering the cabin and sitting in it.

In addition, the ceiling configuration and lighting techniques can be changed in accordance with the present invention in order to cater to different moods of the passengers and also to change the "look and feel" of the passenger cabin during some of the key operations of the passenger airline experience, such as boarding, resting, eating, and the like.

Perceptions of two distinct volumes of space can be achieved with the present invention. First, a generous space can be created that draws the passengers' eyes toward the upper ceiling and provides a more spacious look and feel. In addition, a smaller space "look and feel" can be created which provides a more nurturing private feel as defined by a lower ceiling panel. A secondary ceiling panel can be provided in the cabin which is permeable and has a aesthetic quality which allows it to be used to create the perception of a larger space and smaller space at various times. The ceiling panel and lighting systems allow the architectural space to be viewed differently, ranging from a generous space and atmosphere to one that is more private and nurturing. The secondary panel also acts as an air diffuser panel.

Figure 1:
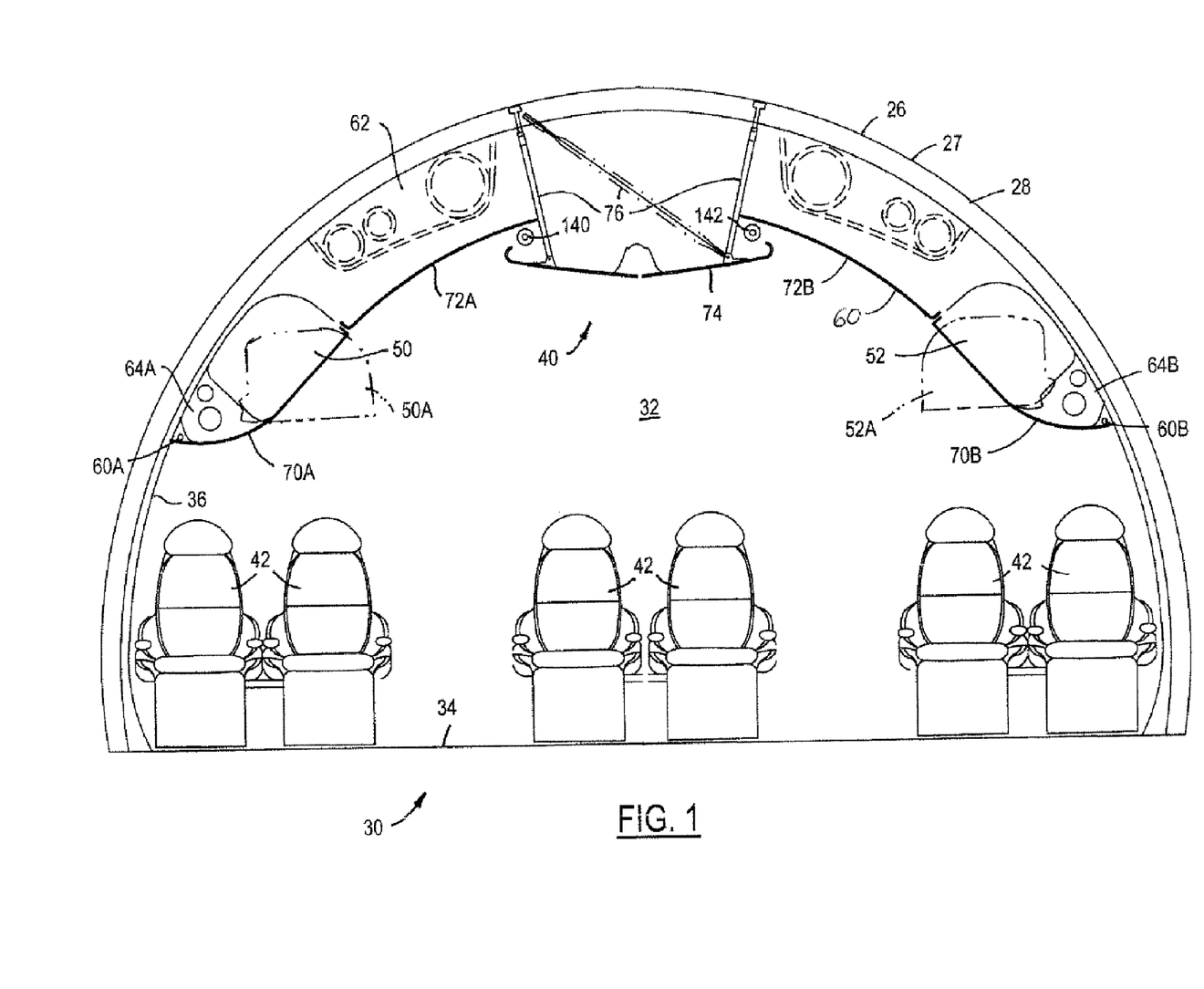
FIG. 1 is the cross-section of an aircraft passenger cabin in accordance with one embodiment of the present invention.

In FIG. 1, the passenger cabin itself is designated by the number 32. The passenger cabin has a floor panel 34, a pair of side wall members or panels 36, 38, a ceiling panel or assembly generally referred to by the numeral 40, and a plurality of passenger seats 42. In FIG. 1, the passenger seats are ranged in three pairs with wide aisles, which is indicative of a "premium" passenger cabin.

The exterior of the airplane fuselage is designated by the reference numeral 26. As is typical and conventional with aircraft, an exterior skin 27 is provided which is attached to circular or semi-circular bulkhead members 28. The bulkhead members 28 provide support and stability for the fuselage of the aircraft.

The passenger cabin 32 has a plurality or rows of outboard stowage bins or racks 50, 52 which are positioned generally at the intersection of the sidewall members 36, 38 and the ceiling panel or system 40. The stowage bins 50, 52 are hinged relative to the passenger cabin such that they rotate from an up or closed position, to a down or opened position 50A, 52A for loading and unloading of luggage, packages and other personal items of the passengers.

In accordance with the present invention, the ceiling system of the aircraft has a curved arch-type configuration 60 as shown in FIG. 1. The curved configuration starts at intersections 60A, 60B with the sidewall members 36, 38, respectively, and continues in a generally arch-type or circular-type configuration across or along the ceiling of the cabin. The crown space 62 between the ceiling panel member 60 and the exterior of the fuselage 26 is typically utilized for support lines and conduits for accessory and auxiliary systems of the aircraft These include conditioned air, water, hydraulic systems and electrical systems, although some of these can be positioned in the lower bay rather than the crown of the aircraft.

The portions between the storage bins 50, 52 and the passenger seats 42 is designated by the reference numerals 64A, 64B in FIG. 1. These areas typically house or include some of the passenger service systems, such as individual seat lighting, air nozzles, and safety masks which are triggered to drop into the passenger's control upon certain emergency situations all as typically known with aircraft and passenger airliners today.

The ceiling panel system 60 includes outboard curved panel members 70A, 70B, inboard curved panel members 72A, 72B, and a central ceiling panel member 74. The central ceiling panel member 74 can be attached to the airplane fuselage structure by strut or support members 76 which are connected to the bulkheads 28, as shown in FIG. 1. Of course, it is also understood that the central ceiling panel member 74 can be attached or suspended to an aircraft in any other conventional manner known to persons of ordinary skill in the art.

Figure 2:
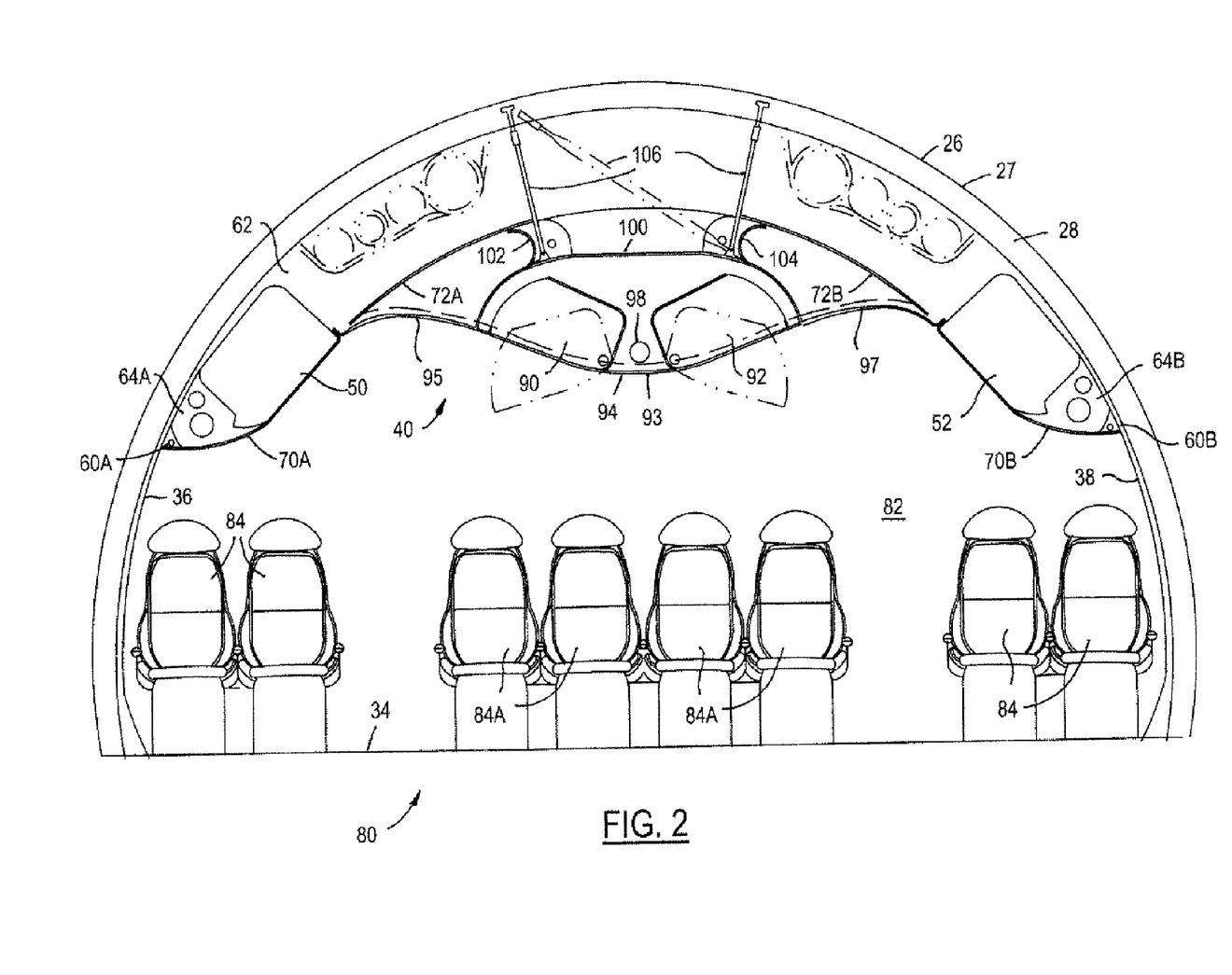
FIG. 2 is a cross-section of an aircraft passenger cabin in accordance with another embodiment of the present invention.

A second embodiment of a passenger cabin structure 82 is shown in FIG. 2 and indicated generally by the reference numeral 80. Passenger cabin 82 has a two-four-two arrangement of passenger seats 84, 84A which indicates that this embodiment has typical application for an "economy" cabin of a passenger aircraft.

Many of the structures and systems of the embodiment shown in FIG. 2 are the same as those shown in FIG. 1 and are designated by the same reference numerals. The primary difference is in the central part of the ceiling system 40. In the embodiment 80 shown in FIG. 2, two additional sets or rows of inboard stowage bins 90, 92 are provided for the passengers located in the central rows of passenger seats 84A. The luggage bins 90, 92 are positioned in the ceiling panel assembly 94 which has the approximate shape of the wing of a bird in flight with the "wings" extending outwardly on both sides. The ceiling panel assembly 94 has a concave curved center panel 93 in which the two stowage bins 90, 92 are positioned and two convex curved panels 95 and 97 which are curved to mate smoothly with the curvature of the outboard ceiling panel members 70A, 70 B in which the outboard stowage bins 50, 52 are positioned.

An additional passenger service unit 98 is positioned in the ceiling panel assembly 94 for use by the passengers located in the central sets 84A of passenger seats.

A support or shroud member 100 is provided to help support and stabilize the panel assembly 94 and stowage bins 90, 92. Diffuser members 102, 104 are positioned between the ceiling panel members 72A, 72B and the shroud member 100. The shroud member 100 is supported by and attached to the bulkhead members 28 of the fuselage 26 by a plurality of support members 106.

Figure 3:
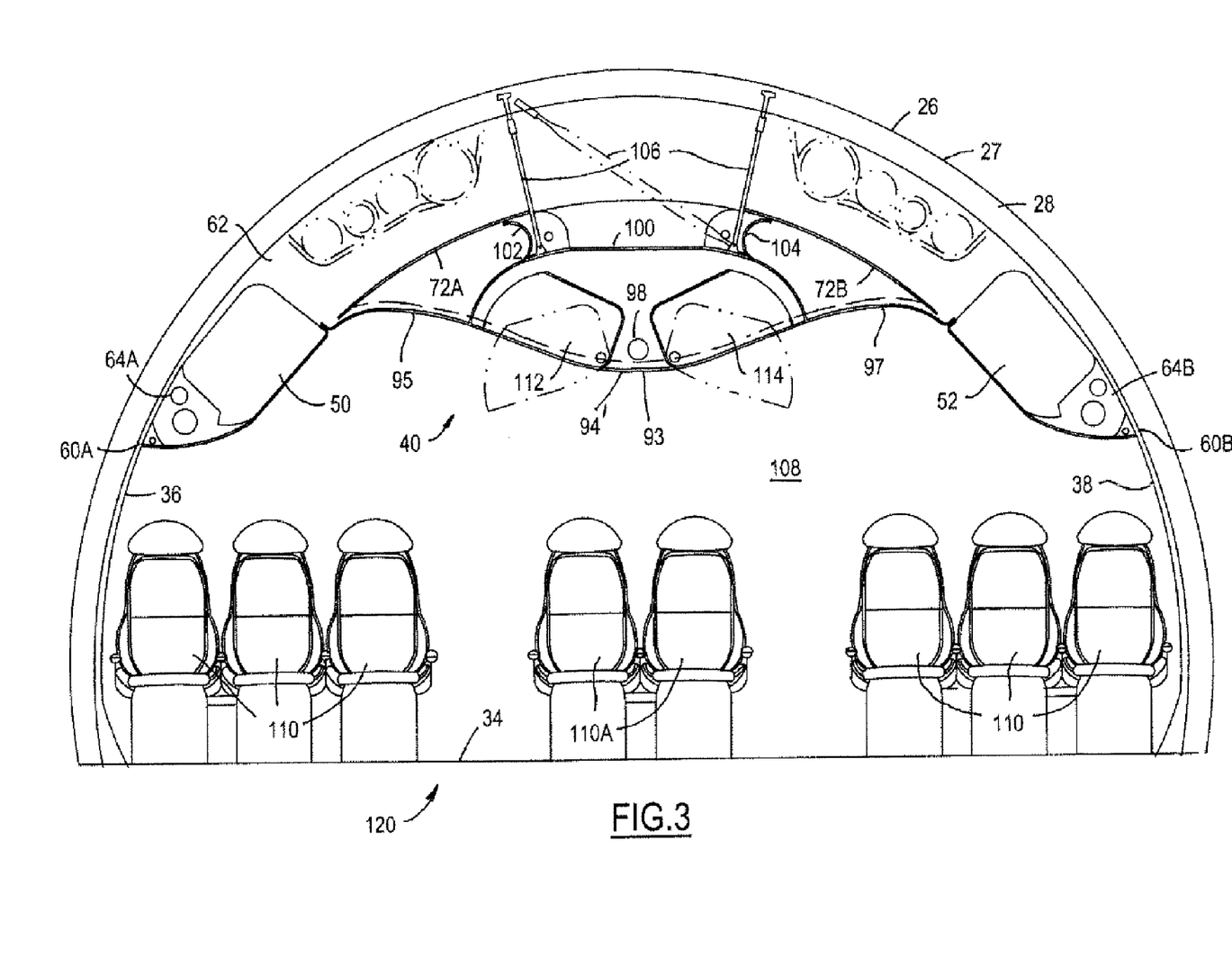
FIG. 3 is a cross-section of still another embodiment of an aircraft passenger cabin in accordance with the present invention.

FIG. 3 is similar to FIG. 2 but illustrates an alternate embodiment in which the passenger seats in the "economy" section of an aircraft have a three-two-three arrangement of seats 110, 110A. In addition, the stowage bins or compartments 112 and 114, which are positioned in the cabin ceiling as part of the ceiling panel assembly 94', are smaller than the corresponding stowage compartments or bins 90, 92 in FIG. 2. Otherwise, the major structural and architectural structures of the embodiment shown in FIG. 3 are similar to those set forth and described above with reference to FIG. 2 and are indicated by the same reference numerals.

The passenger service units 64A, 64B are also referred to as the outboard passenger service unit assemblies, while the passenger service unit 98 in ceiling panel assembly 94 is also referred to as the inboard passenger service unit assembly. Also, the stowage bins or compartments 50, 52 are referred to as the outboard bin assemblies, while the luggage bins 90, 112 and 92, 114 are referred to as the inboard bin assemblies. The shroud 100 is also referred to as the bin strong back.

Figure 4:
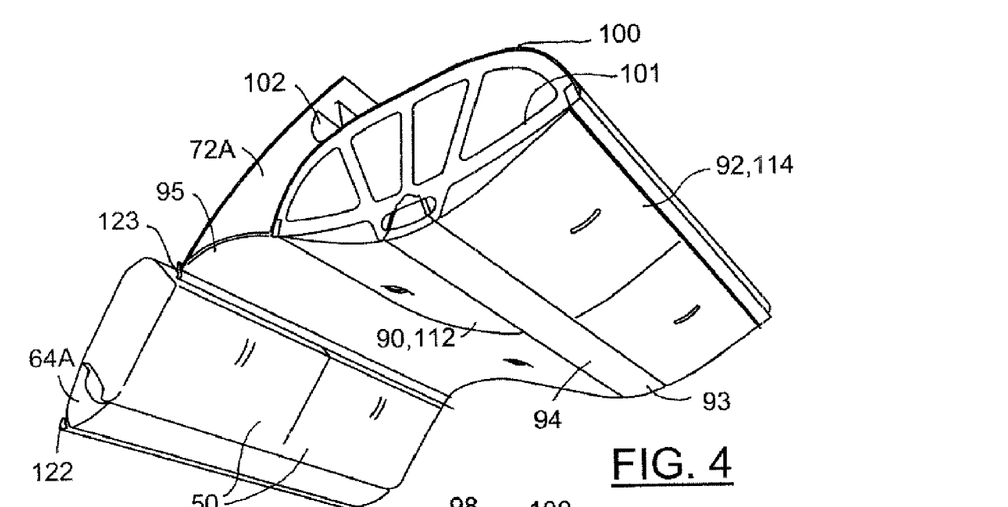
FIG. 4 is a perspective view of a portion of a passenger cabin interior in accordance with an embodiment of the present invention.
Figures 5, 6:
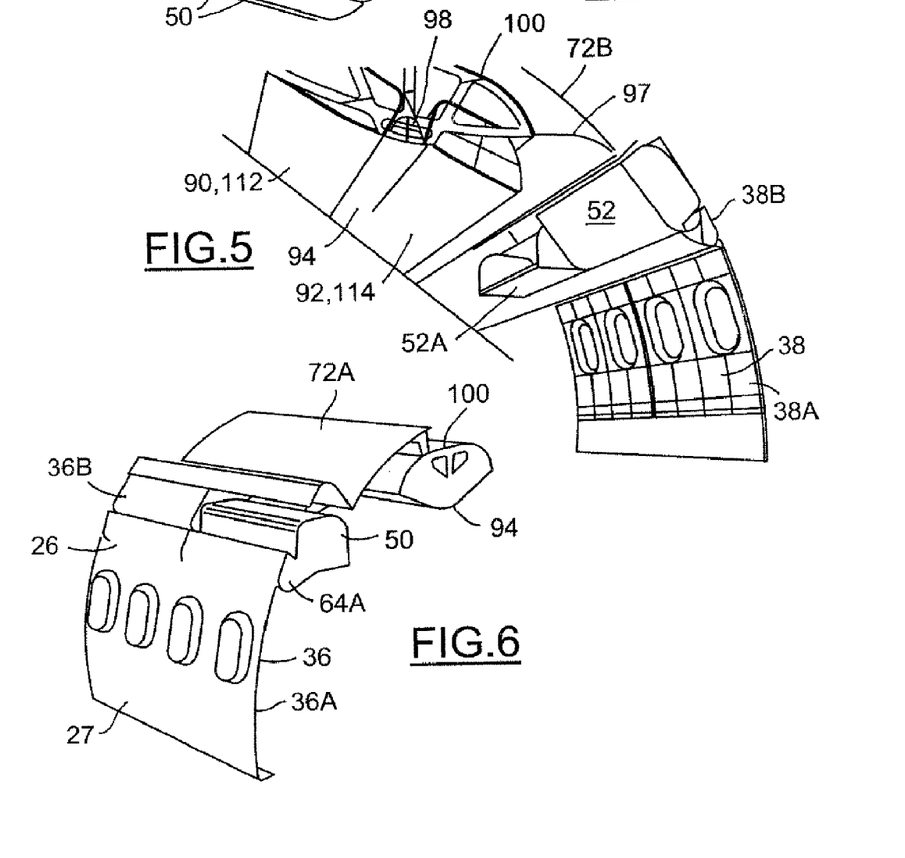
FIGS. 5 and 6 illustrate additional portions of aircraft passenger cabin interiors in accordance with embodiments of the present invention.

FIGS. 4, 5, and 6 are perspective views of portions of the interior structure of the passenger cabins 82, 108 as shown in FIGS. 2 and 3. These figures assist in showing various features of the embodiments of the present invention.

Also shown in FIG. 4 are two electrical conduit-service ducts 122 and 123. Duct 122 is referred to as the lower duct while duct 123 is referred to as the upper duct.

The supporting structure 101 which is within the shroud 100 is the storage bin support assembly and is utilized to hold and support the inboard storage bins. Also, the side wall members 36, 38 include lower side wall panels 36A, 38A and upper sidewall panels 36B, 38B.

Figure 7:
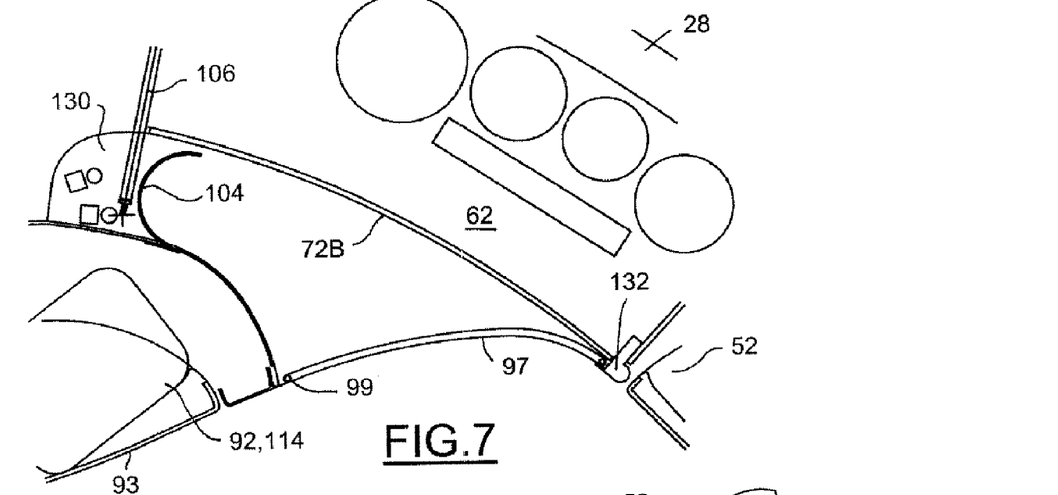
FIG. 7 is a cross-sectional view showing a ceiling panel and light diffuser system in accordance with the present invention.
Figure 8:
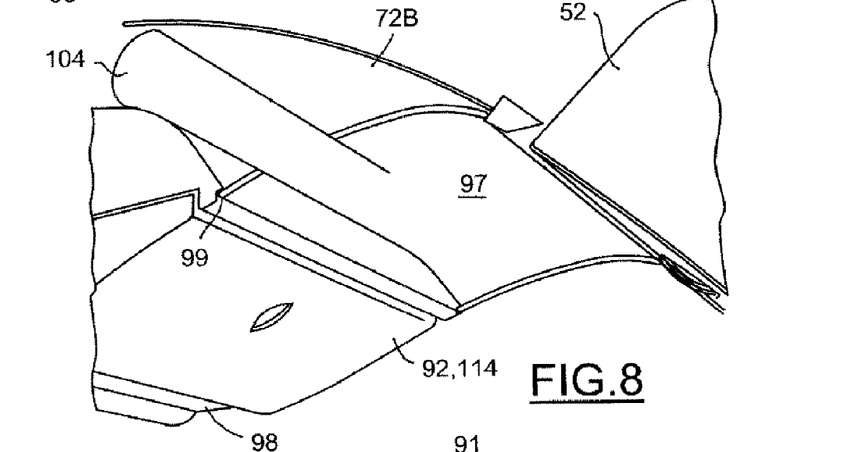
FIG. 8 is a perspective view of a ceiling panel and light diffuser system in accordance with the present invention.
Figure 9:
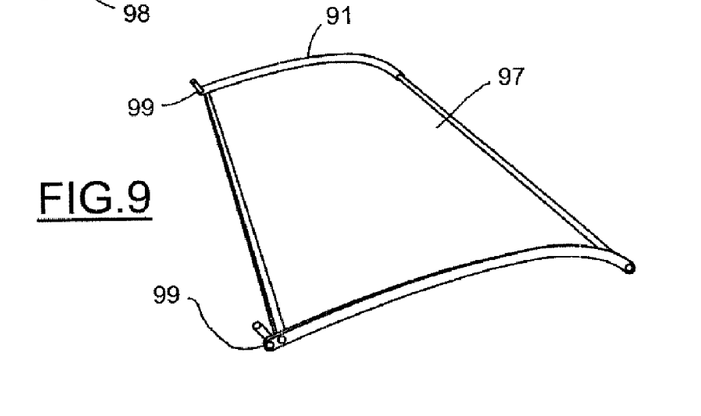
FIG. 9 is a perspective view of a light and air deflector ceiling panel in accordance with the present invention.

FIGS. 7, 8, and 9 provide further details and views of the upper ceiling panels and light diffusers. As shown in FIG. 7, the ceiling panel member 97 is a light diffuser and preferably is a separate piece of translucent material which allows light to come through. The light is provided by lighting assembly 130 which acts through a light diffuser 104 before passing through the panel diffuser 97. By changing the color and intensity of illumination from the light assembly 130, various degrees of brightness of the passenger cabin below the diffuser 97 and various moods can be provided depending on the color.

Member 132 is an electric-conduit-service duct. The duct member 132 also acts as the attachment point for the ceiling panel 72B and the light panel member 97. The ceiling panels preferably are constructed of a honeycomb composite material. Other materials could also be used within the skill of persons or ordinary skill in the art. For example, the ceiling panels could be constructed of a fabric material or other non-rigid materials.

The surfaces of the ceiling panels 93, 95, 97 together with the surface of the outboard and inboard stowage bins 50, 52, 92, 114, 90 and 1112 form the visual ceiling lighting profile throughout one entire section of the passenger cabin. For example, passenger cabins 82 and 108 are shown in FIGS. 2 and 3. Different types and sets of ceiling panels are provided in the areas adjacent the entryway and galley areas.

The panel member 97 is also an air deflector. The ceiling panels 95, 97 are the "wing" panels such that the profile of the ceiling assembly in the passenger compartments 82 and 108, as shown in FIGS. 2 and 3, resemble the stretched wings of a bird in flight.

The panel members 95, 97 filter and reflect light. Depending on the intensity and location of the light sources, the panels can appear either translucent or opaque, thereby creating a change in the visual appearance of the height of the ceiling, or at least a perception thereof.

The panel members 95 and 97 also serve as air deflectors. The panels direct cabin conditioned air fed from the ducts 132 toward the inboard luggage or storage bins 90, 112 and 92, 114 and the passengers seated below. For this purpose, the panel members 95, 97 generally air foil shapes and span the ceiling space between the central panel member 93 in the outboard storage bins.

The panel number 93 preferably consists of a lightweight frame structure with a bonded translucent or perforated material. The panel member 94C is hinged at position 99 (FIG. 7) in order to allow them to be pivoted or rotated down for cleaning or service access.

Figure 10:
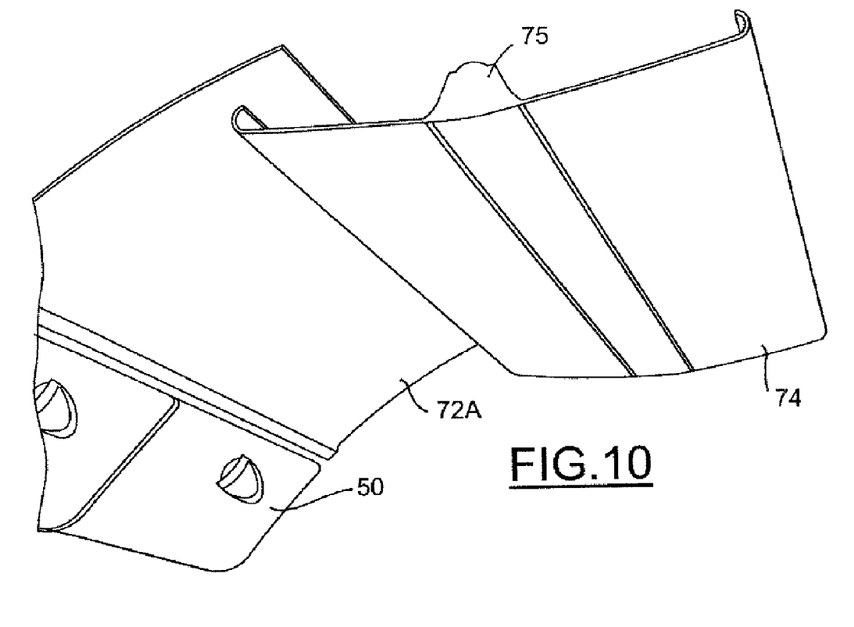
FIG. 10 is a perspective view of a portion of a ceiling system in accordance with the present invention.

The lowered central or secondary ceiling panel 74 as used in the "premium" passenger cabin 92 (FIG. 1) is shown in more detail in FIG. 10. The panel member 74 includes a passenger service unit assembly 75 and is positioned to be supported below the standard ceiling panels 72A, 72B, as shown in FIG. 1. Lighting fixtures or assemblies 140, 142 are positioned between the ceiling panel member 74 and the ceiling panels 72A, 72B, as shown in FIG. 1. By changing the intensity and/or color of the illumination from the lighting fixtures 140, 142, various "mood" changes and lighting effects can be made in the passenger cabin 32.

The ceiling panel members 74 usually butt up against a wind screen assembly or center monument as a close out between the "premium" and "economy" passenger cabins in the aircraft. Modular sizes of the ceiling panel in the shape shown can be provided in order to accommodate various locations of monuments.

Figure 11:
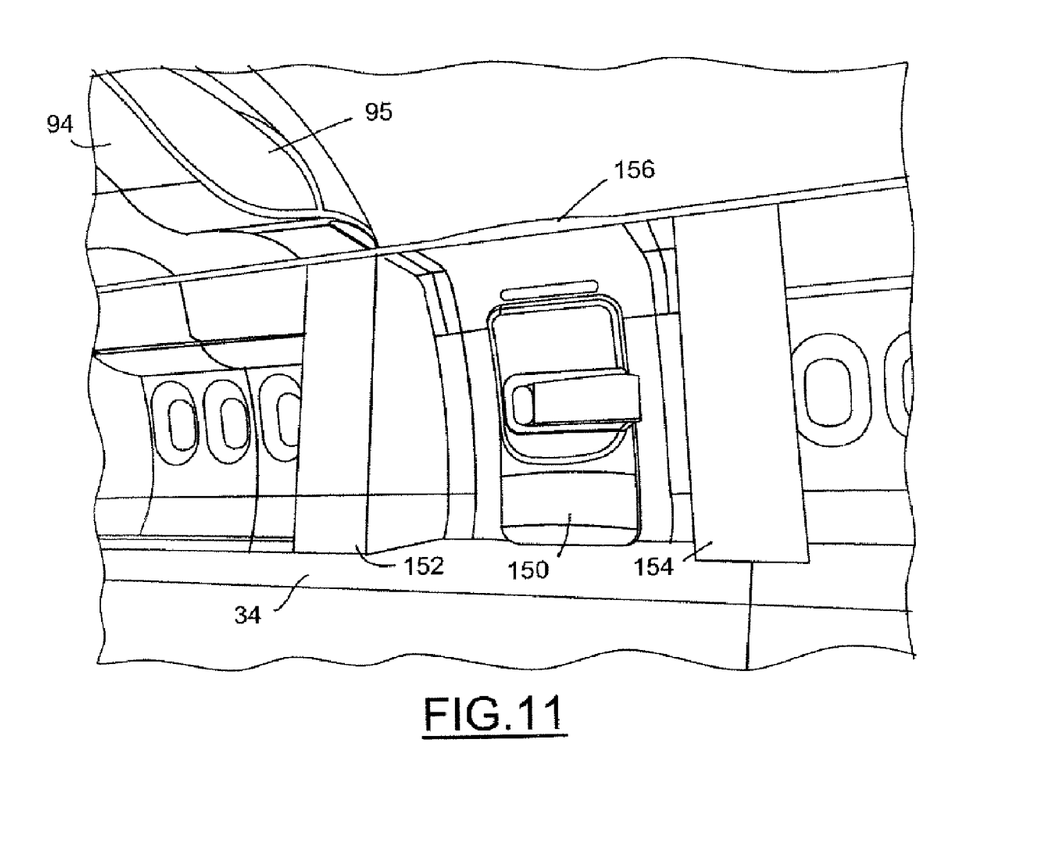
FIG. 11 illustrates monument structures adjacent an exit/entry door structure in accordance with the present invention.
Figure 12:
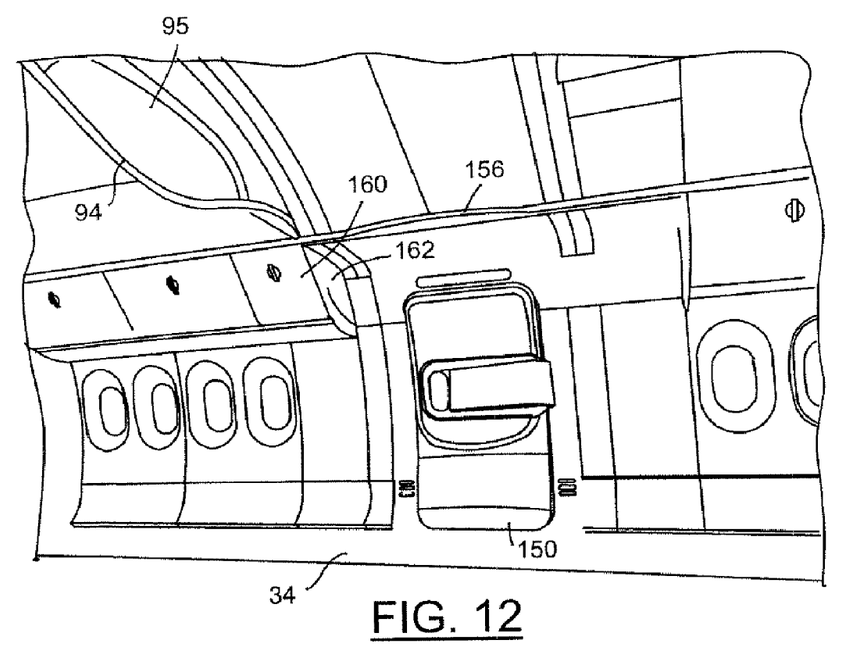
FIG. 12 illustrates an alternate embodiment of an exit/entry door structure in accordance with the present invention.

FIGS. 11 and 12 provide alternative embodiments for the ceiling structure and architecture at the entry/exit door. As shown in FIG. 11, the door member 150 is positioned between two monuments 152 and 154 The "wing-shaped" ceiling panel 94 terminates at a end panel 95. Cantilever ledge member 156 is provided immediately above the access door 150. In FIG. 12, the large monuments shown in the FIG. 11 embodiment are not provided on either side of the door member 150. Instead, the rows or stowage bins 160 are simply terminated with an end panel member 162.

Figure 13:
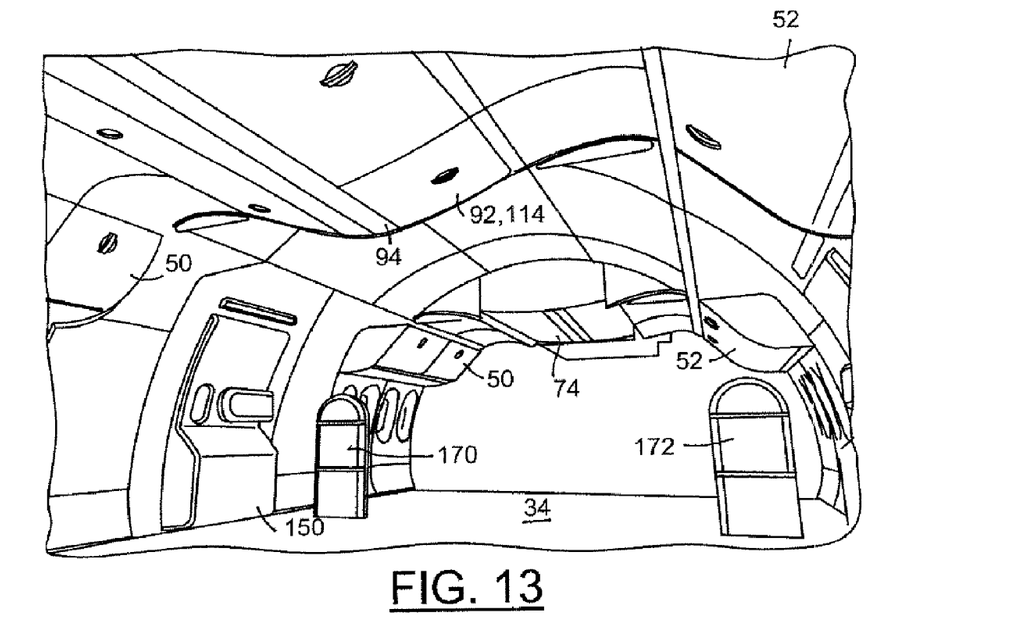
FIG. 13 is a perspective view along the interior of a passenger cabin illustrating other alternative embodiments of the present invention.
Figure 14:
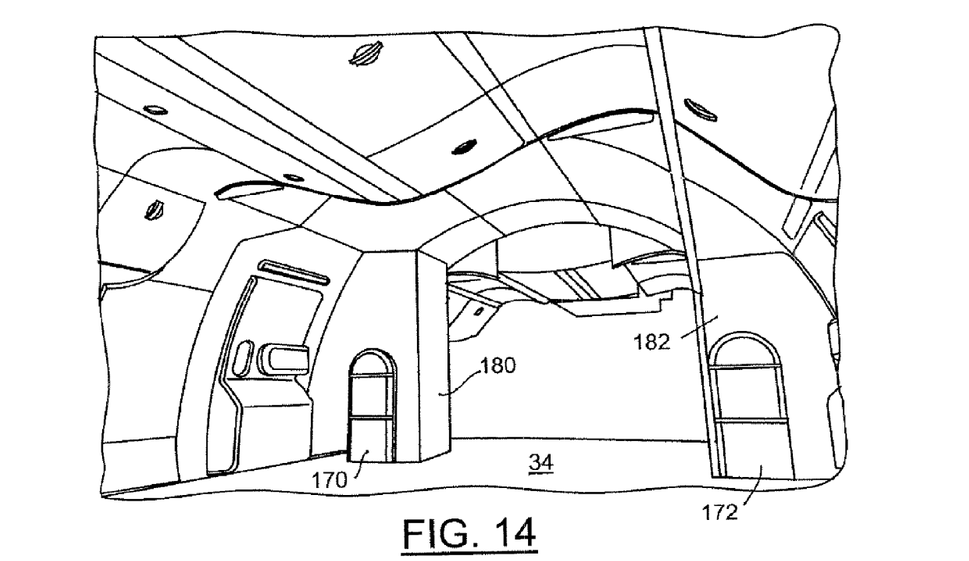
FIG. 14 is another perspective view of a cabin interior illustrating additional optional architectural structures and configurations in accordance with the present invention.

FIGS. 13 and 14 are perspective vies of interiors of aircraft showing two alternative architectural systems. These embodiments have an "open" architecture feel which enhances the sense of mobility for the passengers. In FIG. 13, a pair of freestanding monuments 170 and 172 are provided to separate sections of the passenger compartments. The monuments have "rounded" configurations to provide a more pleasing "look and feel." In FIG. 13, a "economy" passenger cabin similar to cabins 82 and 108 in FIGS. 2 and 3 is shown in the foreground, while a "premium" cabin similar to cabin 32 in FIG. 1 is shown in the background.

FIG. 14 is similar to FIG. 13 with respect to the location of the cabins and the ceiling structures, but FIG. 14 also includes bulkheads 180 and 182 as well as the monuments 170 and 172. The bulkheads are similar to the bulkheads 152 and 154, shown in FIG. 11, and are used to help separate various sections of the passenger cabin along the length of the fuselage.

Figure 15:
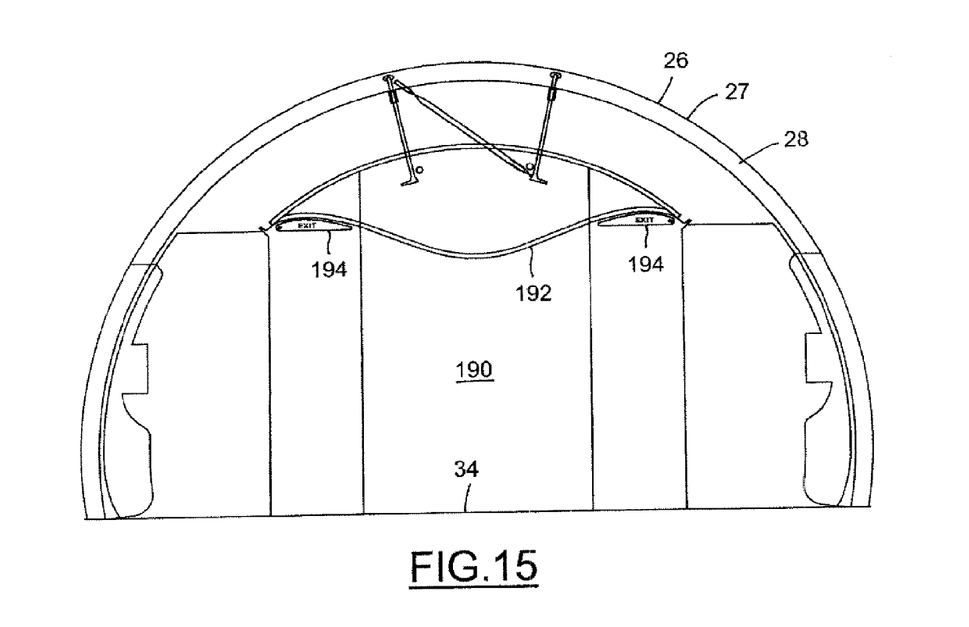
FIG. 15 is another cross-sectional view of a passenger cabin illustrating an embodiment in accordance with the present invention.

FIG. 15 is a schematic cross-section of an airplane fuselage 190 which shows more clearly a "wing"-shaped ceiling structure and configuration that is presented by the present invention. The wing shape is designated by the reference numeral 192. FIG. 15 also shows the location of lighted "exit" signs 194 and show how they can be integrated into the air-foil or wing shape of the ceiling structure 192.

Figure 16:
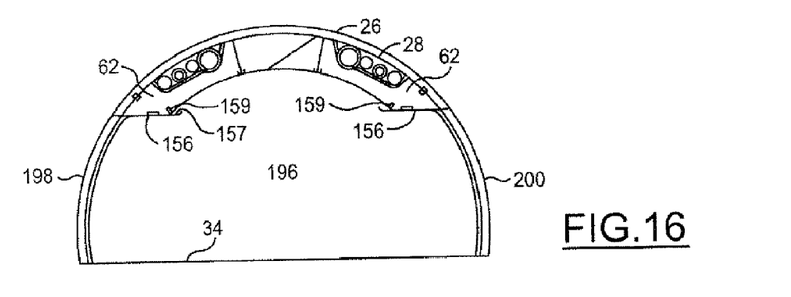
FIG. 16 is still another cross-sectional drawing of still another embodiment in accordance with the present invention.

FIG. 16 is another schematic cross-section through a passenger cabin 196. In this instance, the cross-section shows the entrance or entry/access door areas, and the ceiling configurations at that location. The doors 198 and 200 are positioned on opposite sides of the fuselage 26 and the ceiling canopies are designated by the reference numeral 156, as also shown in FIGS. 11 and 12.

The entry door area ceiling configurations shown in FIG. 16 are preferably installed at the main entrance/exit doors to the passenger cabins. In this regard, the horizontal panel surface is generally parallel to the floor member 34 until it blends into the sidewall. A sculptured ledge area 157 above the entry door contains lighting fixtures (159) which illuminate the ceiling and the entry floor areas.

Preferably, there is minimal surface sculpturing or surface decoration on the ceiling panels. Accent lighting strips and area spot lights can be used to highlight the surfaces and add focus and interest to various areas. The use of color and materials can also play a part in adding interest to the entrance areas.

Figures 17, 18:
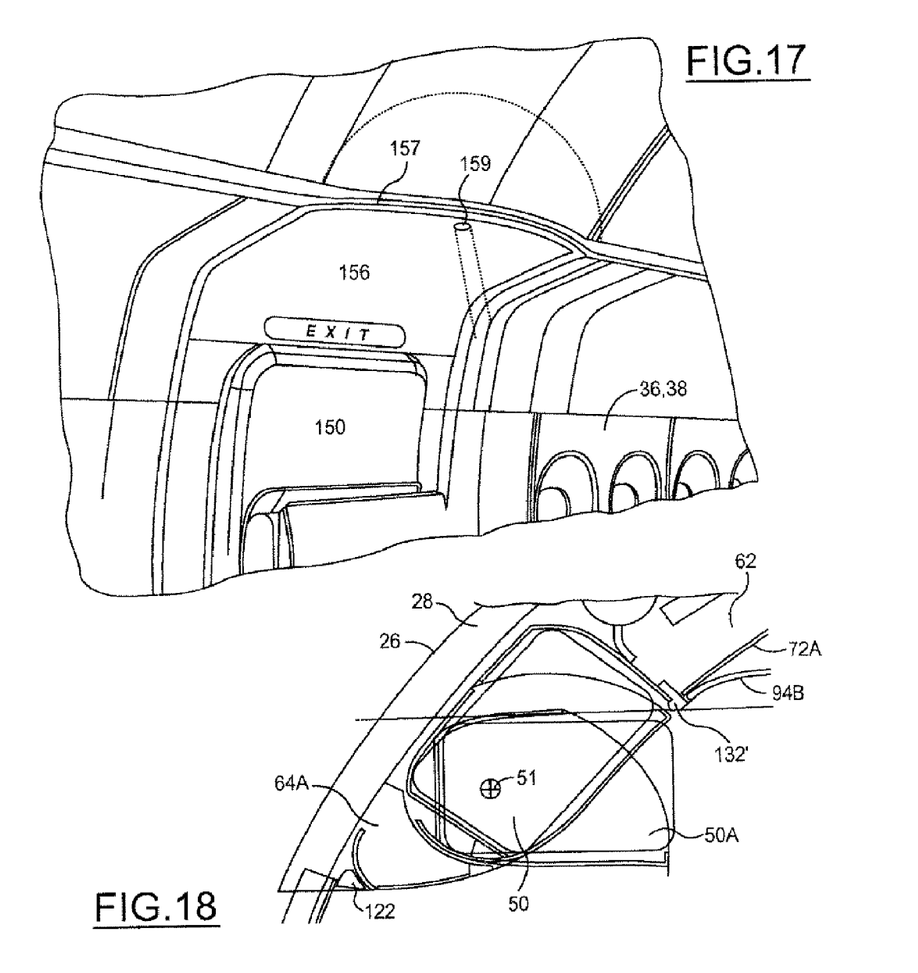
FIG. 17 is a perspective view illustrating a ceiling architectural structure and configuration for an exit/entry door system in accordance with one embodiment of the present invention.
FIG. 18 illustrates an integral stowage bin structure and assembly in accordance with an embodiment of the present invention.

FIG. 17 is a perspective view of an entry/exit door 150 showing the ceiling surface 156 and the ceiling light 159.

Figures 19, 20, 21:
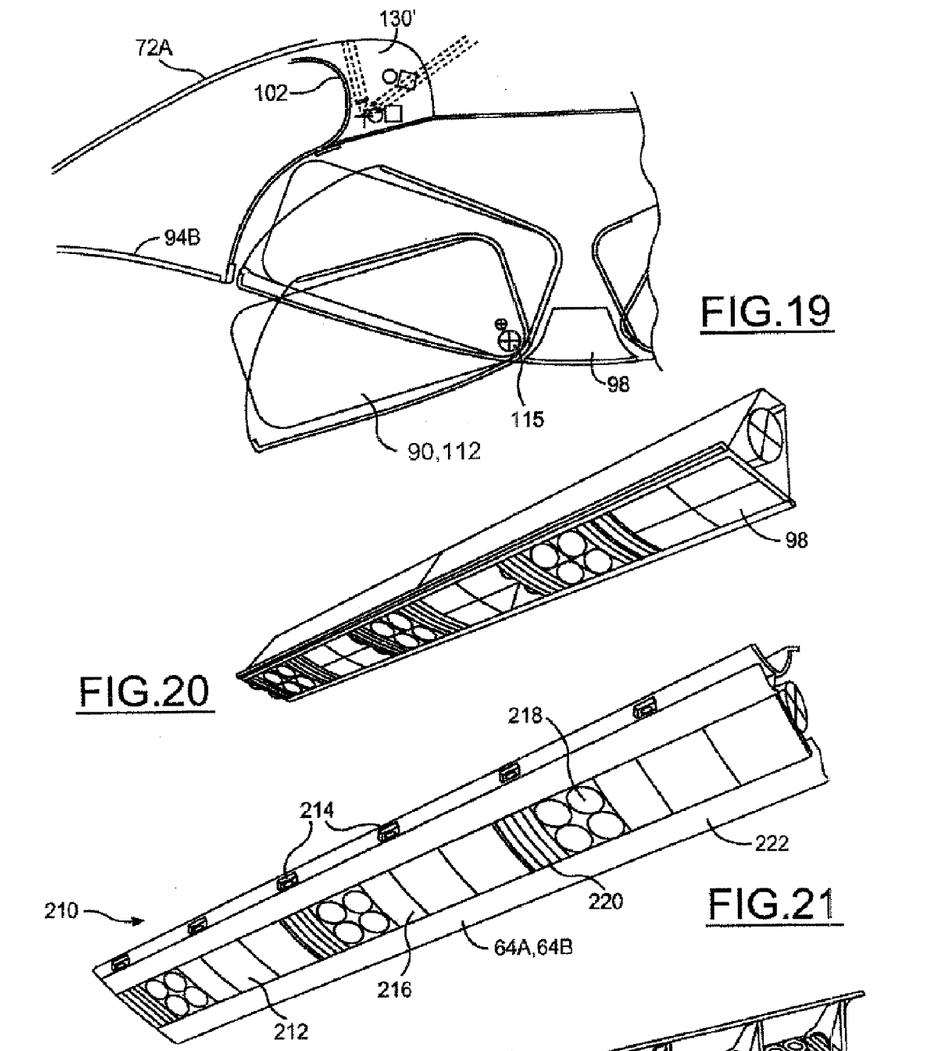
FIG. 19 illustrates another stowage bin structure and configuration in accordance with another embodiment of the present invention.
FIG. 20 is the perspective view of a passenger service unit assembly in accordance with an embodiment of the present invention.
FIGS. 21 and 22 are views of an alternate passenger service unit in accordance with the present invention.

FIGS. 18 and 19 are close-up views showing more details of the outboard and inboard luggage or storage bins. For example, in FIG. 18, the outboard storage bin 50 is shown both in its closed position and its open position 50A. The luggage bin 50 rotates about pivot point 51. In FIG. 19, the inboard luggage or storage bins 90, 112 are shown. They rotate about pivot point 115.

The luggage or storage bins typically have a single pivot and rotate up and down for easy loading/unloading of luggage. The inboard surface of the stowage bins also serve as an air deflector surface to direct air from the outboard passenger service unit assemblies upwardly and away from the passengers walking down the aisle.

Figure 22:
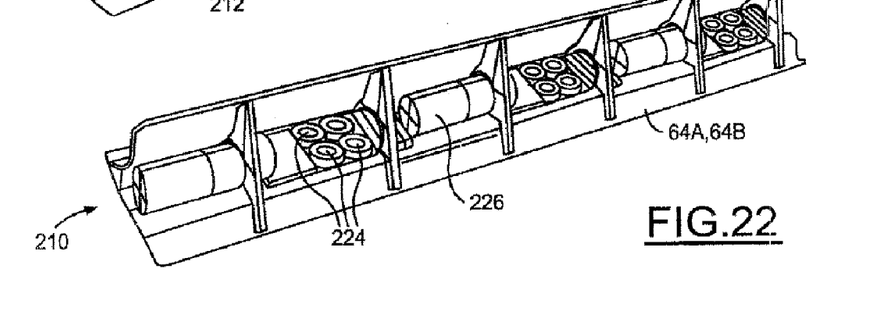

FIGS. 20, 21, and 22 show further details of the passenger service unit assemblies. FIG. 20 depicts the assembly 98 as referred to above with respect to FIGS. 2-5, while FIGS. 21 and 22 depict the assemblies 64A, 64B referred to above with respect to FIGS. 1-6.

The assembly 98 is located between the inboard stowage bins and the center of the fuselage for the passenger cabin configurations shown in FIGS. 2 and 3, namely configurations 82 and 108. The assembly 98 provides services for 2-4 rows of passengers. The services consist of oxygen drop, reading lights and grasper air. Preferably, the assembly is provided as a modular structure unit similar to that shown in FIG. 20. The module includes an air distribution plenum, wiring runs and oxygen canister storage, all with a single connection point to the air conditioning system of the airplane.

The passenger service unit assemblies shown in FIGS. 21 and 22 are located under the outboard storage bins 50, 52 as shown in FIGS. 1-6. Preferably the assemblies are provided as the modular-type structures shown in FIGS. 21-22. These modules provide reading lights for two-three passengers per seat row as well as grasper air for those passengers. The modular assemblies 210 have a filler panel 212, lamp modules 214, grasper module 216, oxygen drop assembly 218, reading light module 220, and sidewall light 222.

In the oxygen drop assembly 218, four oxygen masks 224 are provided (see FIG. 22). Also, the plurality of oxygen cylinders 226 are provided in the module 210 in order to provide oxygen for the oxygen masks 224. The oxygen drops provide emergency oxygen when necessary in the aircraft. The air distribution plenum is provided for grasper air and general cabin air. The sidewall lights provide accent lighting for low level illumination at the underside of the inboards storage bins. The accent lights are provided on the opposite side of the modules from the sidewall lights. They are indicated by reference numeral 214.

Figure 23:
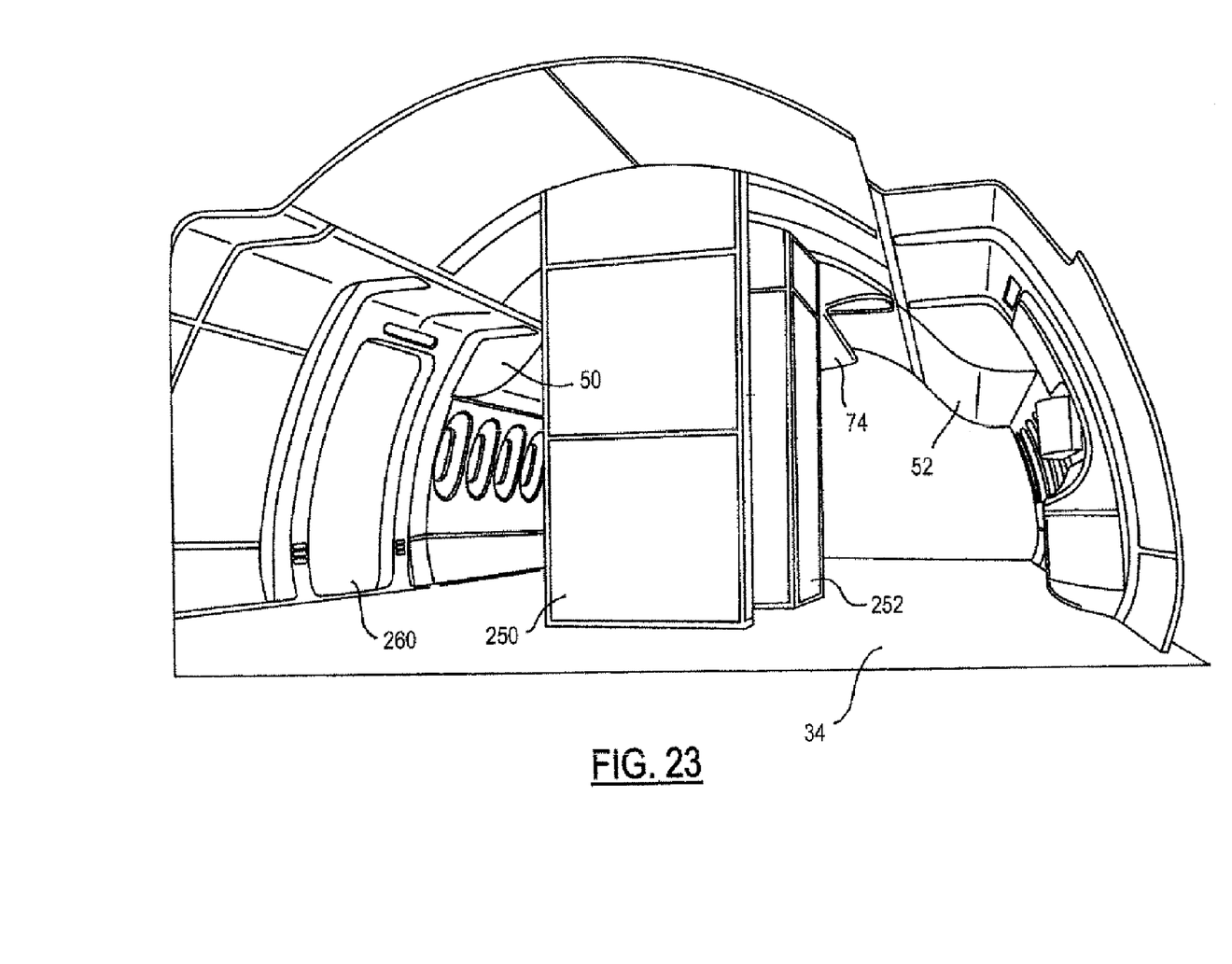
FIG. 23 is still another perspective view of the interior of a passenger cabin illustrating alternative architectural structures and configurations in accordance with other embodiments of the present invention.

FIG. 23 provides still another alternative embodiment of the present invention. In this embodiment, a pair of monuments or bulkheads 250 and 252 are provided basically in the center of the cabin. The monuments are provided adjacent doorway 260 and are used to direct passengers to the different cabins. The monuments or bulkheads 250, 252 also can contain lavoratories and other service facilities for the passengers and crew.

While the invention has been described in connection with one or more embodiments, it is to be understood that the specific mechanisms, processes and procedures which have been described are merely illustrative of the principles of the invention, numerous modifications may be made to the methods and apparatus described without departing from the spirit and scope of the invention as defined by the appended claims.

What is claimed is:

1. An airplane having an elongated fuselage and at least one passenger cabin in the fuselage with a floor member, a pair of side wall members, a ceiling system having a curved arch-type configuration extending between the sidewall members, a plurality of outboard storage bins positioned in the ceiling system generally at the intersection of the sidewall members and the ceiling system, and a plurality of inboard storage bins, wherein the ceiling system comprises:

outboard convex panel members extending from the side wall members to the outboard storage bins;
    inboard concave panel members extending from the outboard storage bins and following the curvature of the fuselage to a central location to form the arch-type configuration; and
    a central panel assembly extending below the inboard concave panel members, extending substantially transverse to the longitudinal axis of the fuselage, and extending across the passenger cabin from the intersection of the inboard concave panel members and the outboard storage bins on one side of the passenger cabin to the intersection of the inboard concave panel members and the outboard storage bins on the other side of the passenger cabin;
    said central panel assembly having a convex central section and two outer concave sections, the plurality of inboard storage bins being positioned in the convex central section of the central panel assembly.

2. An airplane as described in claim 1 wherein the ceiling system blends with said outboard storage bins.

3. An airplane as described in claim 1 wherein the outer concave sections of said central panel assembly are translucent.

4. An airplane as described in claim 3 further comprising at least one lumination mechanism for directing light to the outer concave sections of said central panel assembly.

5. An airplane as described in claim 4 wherein the translucent outer concave sections are capable of both filtering and reflecting light depending on the intensity and location of the lumination mechanism.

6. An airplane as described in claim 5 further comprising a light diffuser positioned between the inboard concave panel members and the central panel assembly for diffusing light before passing through the outer concave sections of the central panel assembly.

7. An airplane as described in claim 1 wherein the outboard storage bins have external configurations which extend the ceiling system configuration to said sidewall members.

8. An airplane as described in claim 1 wherein the outboard storage bins have convex configurations and are adjacent to the outer concave sections of said central panel assembly.

9. An airplane as described in claim 1 further comprising a secondary panel member positioned adjacent to but not in contact with the outboard storage bins.

10. An airplane as described in claim 9 wherein said secondary panel member includes a passenger service unit.

11. An airplane as described in claim 1 wherein the outer concave sections of the central panel assembly and the inboard concave panel members extend from an exterior edge of the outboard storage bins.

* * * * *